United States Patent
Caparros Cabezas et al.

(10) Patent No.: US 9,183,150 B2
(45) Date of Patent: Nov. 10, 2015

(54) MEMORY SHARING BY PROCESSORS

(71) Applicant: International Business Machines Corporation, Armonk, NY (US)

(72) Inventors: Victoria Caparros Cabezas, Zurich (CH); Rik Jongerius, Zurich (CH); Martin L. Schmatz, Zurich (CH); Phillip Stanley-Marbell, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/707,801

(22) Filed: Dec. 7, 2012

(65) Prior Publication Data

US 2013/0159632 A1    Jun. 20, 2013

(30) Foreign Application Priority Data

Dec. 16, 2011 (EP) .................................. 11194116

(51) Int. Cl.
*G06F 12/12* (2006.01)
*G06F 12/08* (2006.01)
*G06F 12/14* (2006.01)
*G06F 13/16* (2006.01)

(52) U.S. Cl.
CPC ........ *G06F 12/0835* (2013.01); *G06F 12/0804* (2013.01); *G06F 12/14* (2013.01); *G06F 13/1663* (2013.01)

(58) Field of Classification Search
CPC ............ G06F 12/0804; G06F 12/0835; G06F 13/1663
USPC ........................................................ 711/143
See application file for complete search history.

(56) References Cited

U.S. PATENT DOCUMENTS

| 5,950,228 | A | 9/1999 | Scales et al. |
| 6,397,306 | B2 | 5/2002 | Ciavaglia et al. |
| 6,418,515 | B1 | 7/2002 | Kurosawa |
| 6,438,660 | B1 * | 8/2002 | Reams .......................... 711/143 |
| 6,829,683 | B1 | 12/2004 | Kuskin |
| 7,392,352 | B2 | 6/2008 | Mithal et al. |
| 7,509,457 | B2 | 3/2009 | Altman et al. |
| 7,882,310 | B2 | 2/2011 | Inoue et al. |
| 8,386,750 | B2 * | 2/2013 | Parker et al. ................... 711/209 |
| 2005/0138277 | A1 * | 6/2005 | Koo ............................... 711/105 |
| 2011/0125974 | A1 | 5/2011 | Anderson |

OTHER PUBLICATIONS

Bennett, et al.; Munin: Distributed Shared Memory Based on Type-Specific Memory Coherence, Department of Electrical and Computer Engineering, Department of Computer Science, Rice University, Houston, TX, 1990, pp. 168-176.
PCT International Search Report and Written Opinion; International Application No: PCT/IB2012/056562; International Filing Date: Nov. 20, 2012; Date of Mailing: Aug. 5, 2013; pp. 1-8.
Bruce Jacob, et al., "Virtual Memory in Contemporary Microprocessors," IEEE Micro, Jul. 18, 1998, pp. 60-75.

* cited by examiner

*Primary Examiner* — Jae Yu
(74) *Attorney, Agent, or Firm* — Cantor Colburn LLP

(57) ABSTRACT

A method of memory sharing implemented by logic of a computer memory control unit, the control unit comprising at least one first interface and second interfaces and is adapted to be connected with a main physical memory via the first interface, and a set of N≥2 non-cooperative processors via the second interfaces, the logic operatively coupled to the first and second interfaces. The method includes receiving, via the second interfaces, a request to access data of the main physical memory from a first processor of the set; evaluating if a second processor has previously accessed the data requested by the first processor; and deferring the request from the first processor when the evaluation is positive, or, granting the request from the first processor when the evaluation is negative.

20 Claims, 2 Drawing Sheets

MEMORY SHARING BY PROCESSORS

PRIORITY

This application claims priority to European Patent Application No. 11194116.7, filed 16 Dec. 2011, and all the benefits accruing therefrom under 35 U.S.C. §119, the contents of which in its entirety are herein incorporated by reference.

BACKGROUND

The invention relates to the field of computer science, and more specifically, to a method implemented by a logic of a computer memory control unit for memory sharing by processors, to a computer memory control unit comprising such logic, to a computer program comprising instructions for configuring such logic and to a data storage medium having recorded thereon such program.

Shared-memory architectures enable several processes to share portions of their address spaces. Existing shared-memory hardware architectures and their corresponding protocols for sharing memory assume a set of cooperative processors. One existing possibility is that all the processors implement a same memory access interface hardware, which is not standard, but is adapted for cooperation between the processors in order for them to access the shared memory in a smooth manner. Another existing possibility is that all processors have specific software components installed thereon that allow them to communicate together or with a central hardware in order to cooperate to emulate a virtual shared memory. Such existing possibilities require a specific component installed on each processor sharing the memory: a specific hardware interface adapted for cooperation in one case, or specific software and a virtual shared memory emulated using the unshared memories of the individual processors in the other case. This makes such architectures costly and complicated to achieve in the former case, or lagging the performance of physically shared memories in the latter.

With the growing popularity of heterogeneous architectures, there is an increased interest in the implementation of mechanisms that allow non-homogeneous architectures to execute processes that may communicate through a shared region of memory, even though the processors in question may not implement the same (or any) shared-memory protocol interface.

There is thus a need for an improved solution for memory sharing.

SUMMARY

In one embodiment, a method of memory sharing implemented by logic of a computer memory control unit, the control unit comprising at least one first interface and second interfaces and is adapted to be connected with a main physical memory via the first interface, and a set of N≥2 non-cooperative processors via the second interfaces, the logic operatively coupled to the first and second interfaces. The method includes receiving, via the second interfaces, a request to access data of the main physical memory from a first processor of the set; evaluating if a second processor has previously accessed the data requested by the first processor; and deferring the request from the first processor when the evaluation is positive, or, granting the request from the first processor when the evaluation is negative.

In another embodiment, a system includes a computer memory control unit having at least one first interface and second interfaces and is adapted to be connected with a main physical memory via the first interface, and a set of N≥2 non-cooperative processors via the second interfaces; logic operatively coupled to the first and second interfaces, the logic configured to: receive, via the second interfaces, a request to access data of the main physical memory from a first processor of the set; evaluate if a second processor has previously accessed the data requested by the first processor; and defer the request from the first processor when the evaluation is positive, or, granting the request from the first processor when the evaluation is negative.

In another embodiment, a computer readable storage medium having computer readable instructions stored thereon, that when executed by a computer implement a method of memory sharing implemented by logic of a computer memory control unit, the control unit comprising at least one first interface and second interfaces and is adapted to be connected with a main physical memory via the first interface, and a set of N≥2 non-cooperative processors via the second interfaces, the logic operatively coupled to the first and second interfaces. The method includes receiving, via the second interfaces, a request to access data of the main physical memory from a first processor of the set; evaluating if a second processor has previously accessed the data requested by the first processor; and deferring the request from the first processor when the evaluation is positive, or, granting the request from the first processor when the evaluation is negative.

BRIEF DESCRIPTION OF THE SEVERAL VIEWS OF THE DRAWINGS

A system and a process embodying the invention will now be described, by way of non-limiting example, and in reference to the accompanying drawings, where.

DETAILED DESCRIPTION

Figure 1:
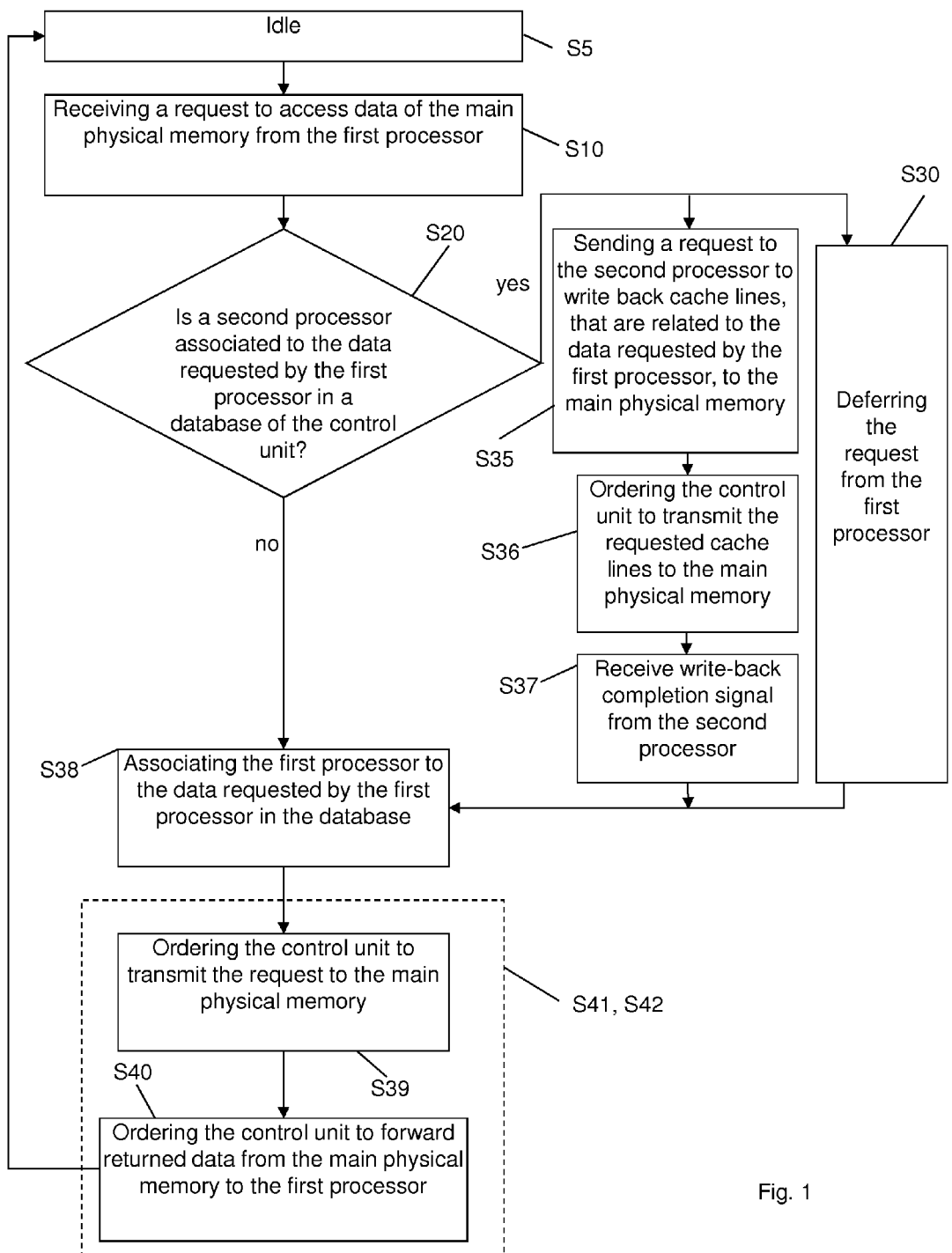
FIG. 1 is a flowchart of a method of memory sharing according to an exemplary embodiment.

Proposed is a method implemented by logic of a computer memory control unit. The control unit comprises at least one first interface and (several) second interfaces and is adapted to be connected with a main physical memory via the first interface, and a set of N≥2 non-cooperative processors via the second interfaces. The logic is operatively coupled to the first and second interfaces. The method comprises receiving, via the second interfaces, a request to access data of the main physical memory from a first processor of the set. The method also comprises evaluating if a second processor has previously accessed the data requested by the first processor. The method further comprises deferring the request from the first processor when the evaluation is positive, or, granting the request from the first processor when the evaluation is negative. Such a method allows N processors connected to the control unit via the second interfaces to share a memory connected to the control unit via the first interface in an improved way.

The (computer memory) control unit is a hardware material suitable for controlling access to a physical memory by a plurality of processors, which may possibly be integrated into a system, such as a computer.

The control unit comprises at least one first interface and second interfaces. In other words, the control unit comprises a first set of at least one interface (i.e., the "first interface") and a second set of at least two interfaces (the "second interfaces"). The first interface, on the one side, and the second interfaces, on the other side, are all tools for connecting with hardware, comprising hardware elements (such as connections) and software elements (such as a program for interpreting signals received by the control unit through a given interface and/or for transmitting signals via a given interface), the first interface and the second interfaces differing in that they are suited to connect the control unit with different material. Indeed, on the one hand, the control unit is adapted to be connected with a main physical memory (of the computer, should it be the case) via the first interface, which is thus suited therefore. On the other hand, the control unit is adapted to be connected with processors via the second interfaces. There are at least two second interfaces, such that there are at least three interfaces in total (at least one first interface and at least two second interfaces). This way, the control unit may be connected with a set of N≥2 non-cooperative processors.

The main memory may be one unit with a corresponding interface matching the first interface. Alternatively, the main memory may have several interfaces, the control unit having possibly several first interfaces in this case, or the main memory may consist in several units each having one or several interfaces, the control unit having in this case several first interfaces, e.g., at least one per unit.

The processors are said to be non-cooperative because they may be standard processors. For example, the processors may exclude any hardware component specifically designed for cooperation between the processors. Also, the processor may exclude having recorded thereon complex software designed for allowing communication between the processors in view of cooperation. Thus, the method allows sharing memory by several processors in a cheap and easy manner. In an example, the processors may have different microarchitectures and virtual memory interface definitions. Thus, the method allows sharing memory by several processors even though these processors may be different. The second interfaces may be double-data-rate interfaces, which is a widely known standard and thus cheap and easy to implement. Also, at least two of the second interfaces may be different.

The method covers a hardware architecture and corresponding access protocol that allows processors that possibly define different architectures and virtual memory interfaces, to communicate through a shared region of memory. The method may thus work at the level of standard DRAM electrical and protocol interfaces. In one embodiment, an industry standard double-data-rate (DDR) interface is extended with a signal indicating the availability of data from DRAM arrays. Existing DDR interfaces already have analogous (but optional) DQS and RDQS signals. As these signals are optional, many implementations currently assume data is available after a fixed delay. The method relies on the fact that commodity processors, irrespective of their architecture and virtual memory interface definition, access main memory through physical, standardized memory interfaces, such as the JEDEC standardized DDR memory interface.

The control unit (which may also be referred to as the coherence control unit or CCU) is thus connected to every processor and to the main memory, both connections possibly using standardized memory interfaces, for example the JEDEC standard DDR memory interfaces. Therefore, all the memory addresses mentioned hereafter may refer to physical DRAM addresses. Any other memory interface that is widely supported across processor architectures and memory modules could however also be used.

The control unit further comprises the logic. Logic comprises hardware having processing capabilities and following predetermined schemes, e.g. thanks to instructions stored on a memory. The logic is operatively coupled to the first and second interfaces. In other words, the logic has access to the interfaces and may thus process information passing via the interfaces. The logic may thus receive and process information received by the control unit from outside the control unit via the interfaces, and/or the logic may order the control unit to send information outside the control unit via the interfaces.

The method performed by the logic of the control unit will now be described with reference to FIG. 1, which represents a flowchart of an example of the method.

The method of the example comprises staying in an idle state (S5). In such a case, the logic waits for the first active event of the method to occur before performing actions. Also, the logic may return to the idle state when it has finished its actions.

The method comprises receiving (S10), via the second interfaces, a request to access data of the main physical memory from a first processor of the set. In other words, a processor of the set, the "first" processor, requires to access to the main physical memory. This request is performed as if the processor were connected directly to the main memory. In other words, the processor does not "see" the control unit, and acts as connected directly to the main memory, as this is usually the case.

The method then comprises evaluating (S20) if a second processor has previously accessed the data requested by the first processor. In other words, the logic verifies if another processor, the "second" processor, has already accessed the same data that are requested by the first processor. In the example, the evaluation (S20) comprises checking in a database of the control unit if a second processor is associated to the data requested by the first processor. The control unit may thus include such a database, and thus a dedicated memory for storing it (e.g., an internal memory, or a part of the main memory). Such a database may consist of a lookup table associating to (e.g., an identifier of) data of the main memory a (e.g., identifier of a) processor. This allows the control unit to avoid collisions between processors requesting substantially simultaneous access to the same data of the main memory.

Indeed, when the evaluation (S20) is positive (i.e., a second processor has previously requested access to the same data that is now requested by the first processor), there may be collision (i.e., the two processors may be working on the same data and possibly modifying it without sharing the modifications with the other, or reading it while it is modified by the other without knowing that it is modified, and thus not reading the modifications). Thus, the method comprises deferring (S30) (i.e., putting on hold) the request from the first processor in such a case. This provides time for implementing actions to ensure that there will be no collision and avoid such. Otherwise (i.e., if the evaluation (S20) yields the result that no processor has requested the data yet), the method comprises granting (S41) the request from the first processor when the evaluation is negative.

In the example, while deferring (S30) the request from the first processor (i.e., while the request from the first processor is put on hold), the method comprises, in parallel, sending (S35) a request to the second processor to write back cache lines to the main physical memory. The cache lines that are required to be written back may be related to the data requested by the first processor. In other words, the logic requests the second processor, i.e. the one that has accessed the same data that is requested by the first processor, to send all the data (or the data related to the requested data only) stored on its cache(s) to the control unit. This may be performed via an interrupt pin of the second processor. If there is such data (i.e., the second processor has not written back its cache lines yet), the logic monitors reception of this data (not represented in the flowchart) and orders (S36) the control unit to transmit the requested cache lines, that are received by the control unit from the second processor, to the main physical memory. In other words, the logic ensures the transfer of the data to the main memory. Thus, the work on the data which was being performed by the second processor is committed to the main memory.

Once the second processor has written back all requested cache lines to the main physical memory, which may be verified by receiving (S37) (by the logic) a completion signal from the second processor, the method may comprise granting (S42) the request from the first processor.

The granting (S41) and the granting (S42) implement the same actions, but they have a different reference due to the fact that they are preceded by different steps of the method.

In the example, before granting (S41, S42) the request of the first processor, and upon such granting (S41, S42), the method further comprises associating (S38) the first processor to the data requested by the first processor in the database. This way, it is ensured that further executions of the method will work. In the case there is a second processor and the result of the evaluation (S20) was positive, the first processor may replace the second processor in the database.

In the example, granting (S41, S42) the request of the first processor comprises ordering (S39) the control unit to transmit the request to the main physical memory and then ordering (S40) the control unit to forward returned data from the main physical memory to the first processor. Indeed, the processors (including the first processor) act as if they were directly connected to the main memory, but the control unit intercepts all signals and manages them. This will be made clearer when describing the control unit with reference to FIG. 2.

As an efficiency optimization, the addresses of data items in memory may be grouped into blocks referred to within the CCU as CCU physical pages, and all management of data ownership performed at such granularity. This may, for example, reduce the number of entries the CCU will have to maintain in its database, but may require more data to be written back to memory in step S35.

The method offers a shared-memory protocol and is better performed with a homogeneous memory organization. The control unit may thus define a common address space, and the physical memory may be divided into shared, physical pages—independent of page sizes used in the individual processors. Each processor may implement a different virtual memory interface, each with its own number of pages and page size. For example, for a 32-bit PowerPC and x86 architectures (one of the processors may present such features), the physical page size may be 4 KB, whereas for DEC/Compaq Alpha, it may be 8 KB (one of the processors may present such features). This is explained for example in a paper by B. Jacob and T. Mudge entitled "Virtual memory in contemporary microprocessors" IEEE Micro, 18:60-75, July 1998.

The control unit may translate the physical address requests by each processor to the corresponding control unit physical page number in a database (e.g. a unified memory address space), such as physical page ID lookup table (PPIDT). Several criteria can be used to choose the common control unit page size. Larger control unit page sizes will lead to smaller numbers of entries in the PPIDT, but will require more items to be written-back to memory when the control unit notifies a processor of a write-back request and thus degrade performance.

Shared data is thus tracked in this case at the control unit's physical page granularity; i.e., a data access to a shared memory location is identified by the physical page identifier (PPI) associated with that location. The CCU monitors every DRAM memory access. Using a mapping table, it records the identity of the processor that initiated the request upon occurrence of a memory access to a shared location, and the PPI associated with the accessed, shared page. This information is used to guarantee consistency when a different processor attempts to access to the same physical location.

Another example of carrying out the method, similar to the one provided with reference to FIG. 1, is now discussed. The features of this example may be integrated to the example provided with reference to FIG. 1.

In this example, initially, the CCU is in an idle state. When a processor initiates a read from memory, the request leaving the processor going out to DRAM is intercepted by the CCU. The CCU then performs a lookup in the processor to physical page ID lookup table (PPIDT). This lookup is used to determine whether the physical page, where the requested data is located, has been previously requested (and, therefore, potentially modified) by a different processor. If the PPID corresponding to the address is not in the table, the processor accesses DRAM, and the CCU updates the PPIDT, adding a new entry that maps the processor to the corresponding common physical page. The data movement from DRAM to processor is then initiated by the CCU.

If a different processor attempts to access data in the same physical memory page, the PPIDT lookup will reveal that the page has previously been read by a different processor. In that case, to guarantee data consistency, the CCU sends a request to processor to write back all cache lines corresponding to the physical page which is listed alongside processor in the PPDIT. This request is implemented using an interrupt signal through a generic processor interrupt pin. The CCU must wait until the processor signals back that the memory write has been completed, which can be done through a general-purpose input-output pin, or a write to a non-cacheable address.

Once it is guaranteed that the data has been written back to memory, the CCU updates the PPIDT removing the old entry in the PPIDT and creating a new one for processor containing the PPID of the corresponding CCU physical memory page. Finally, the CCU initiates the request to main memory so that data can be transferred to the corresponding processor.

It must be ensured that the processors does not begin to clock in data words after a fixed delay, as would be the case if it were connected directly to DRAM (via its memory controller). One approach to ensure this, in the embodiment where the standard interface is DDR, is to ensure that processors using a CCU implement (and faithfully monitor) the optional DQS DDR interface signal on each read request; this enables the processors to know when valid data is available. Possible alternative approaches might include overriding the existing memory timing setup information, which is stored in serial presence detect (SPD) EEPROMs on memory DIMMs, and read by the processors at startup. When the data from DRAM is ready, it is forwarded by the CCU to the corresponding processor.

According to the foregoing description, the PPIDT is updated whenever a processor initiates a new transaction. Processor caches, however, may be flushed in the interim, or the data that caused a new entry to be added into the table may be evicted to allocate more recent data. In this situation, the CCU may not be able to detect the change in the processor cache. The CCU must, therefore, internally model the cache replacement for the different processor caches so that it can predict whether a specific data item has been evicted from memory. In situations where modeling within the CCU is not possible, all lines in the respective caches might have to be evicted.

An alternative implementation could consist of having one control unit per processor, and synchronization of the different instances of the control unit, possibly using an interconnect network between the CCUs.

Now, the logic may be part of a computer memory control unit. The control unit comprises at least one first interface and second interfaces and is adapted to be connected with a main physical memory via the first interface, and a set of N≥2 non-cooperative processors via the second interfaces. The control unit further comprises the logic, which, again, is operatively coupled to the first and second interfaces and is configured to perform the method. Such a computer memory control unit allows a plurality of non-cooperative processors to share a same main physical memory in an efficient, cheap, and simple manner.

Figure 2:
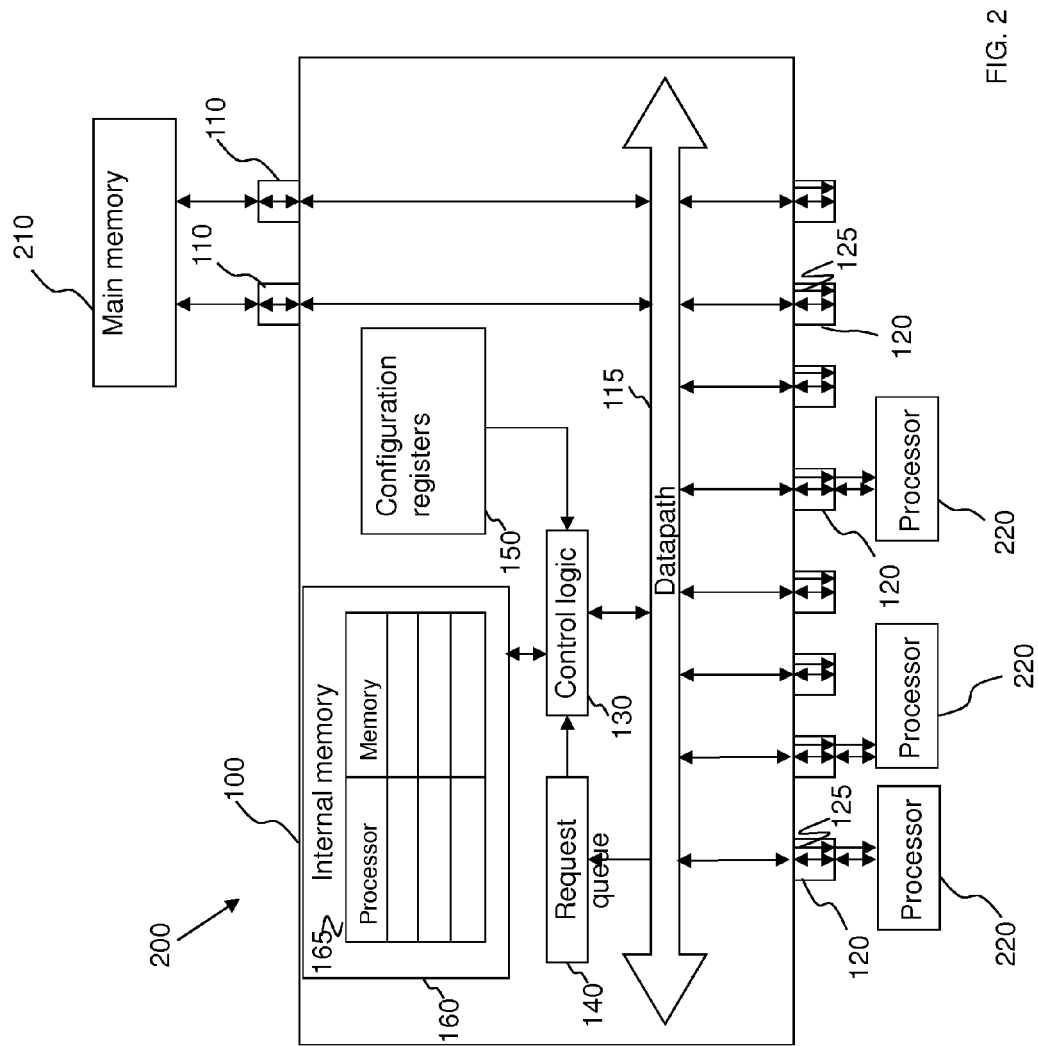
FIG. 2 shows a graphical representation of a computing system having computer memory control unit suitable for implementing the method of FIG. 1.

The computer memory control unit may itself be part of a system comprising the computer memory control unit connected with a main physical memory via the first interface and with a set of N≥2 non-cooperative processors via the second interfaces FIG. 2 is a block diagram of hardware of an example of the system, which may be a computer system with multiple processors sharing a main physical memory, or a computer network comprising multiple computers (and thus multiple processors) sharing a main physical memory (possibly a virtual memory).

In the example, system 200 comprises computer memory control unit 100. Computer memory control unit 100 is connected with main physical memory 210 (also part of system 200) via first interfaces 110. Computer memory control unit 100 is further connected with three processors 220 via second interfaces 120.

Control unit 100 thus comprises at least one first interface 110 and at least two second interfaces 120 (eight in the example) and is adapted to be connected with main physical memory 210 via first interfaces 110, and the non-cooperative processors 220 via the second interfaces 120. Control unit 100 further comprises (control) logic 130, which is operatively coupled to first interfaces 110 and second interfaces 120 via datapath 115, and is configured to perform the method. Second interfaces 120 each comprise interruptor 125, which is adapted to send a signal through an interrupt pin of processors 220 in order to send to a request to the processors 220 to write back cache lines.

Datapath 115 is adapted to centralize information sent by control logic 130 or received from any interface (110, 120). Datapath 115 may comprise for that any or a combination of means for directing data, such as redirection multiplexers, write-back buffers, and/or a bus.

Control unit 100 also comprises request queue 140, which is adapted to queue requests received by processors 220. Control unit 100 also comprises configuration registers 150 and internal memory 160 which stores PPIDT 165. This way, control unit 100 is adapted to interpret a request received from a processor 220 as a request for accessing a given page of main memory 210, and may, thanks to lookup table 165, be evaluated if another processor 220 has previously accessed the given page.

As has been appreciated by one skilled in the art, aspects of the present invention may be embodied as a computerized system, method for using or configuring the system, or computer program product for performing the method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) (i.e., data storage medium(s)) having computer readable program code recorded thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, i.e., data storage medium, may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the likes and conventional procedural programming languages, such as the "C" programming language or similar programming languages. The program code may be executed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to one aspect, the invention is embodied as a method implemented by a logic of a computer memory control unit. The control unit comprises at least one first interface and second interfaces and is adapted to be connected with a main physical memory via the first interface, and a set of N≥2 non-cooperative processors via the second interfaces. The logic is operatively coupled to the first and second interfaces. The method comprises receiving, via the second interfaces, a request to access data of the main physical memory from a first processor of the set. The method also comprises evaluating if a second processor has previously accessed the data requested by the first processor. The method further comprises deferring the request from the first processor when the evaluation is positive, or, granting the request from the first processor when the evaluation is negative.

In examples, the method may comprise one or more of the following features: the method comprises, while deferring the request from the first processor, sending a request to the second processor to write back cache lines, that are related to the data requested by the first processor, to the main physical memory; sending the request to the second processor is performed via an interrupt pin of the second processor; the method comprises, while deferring the request from the first processor, and after sending the request to the second processor, ordering the control unit to transmit the requested cache lines, that are received by the control unit from the second processor, to the main physical memory; the method comprises, once the second processor has written back all requested cache lines to the main physical memory, granting the request from the first processor; the evaluation comprises checking in a database of the control unit if a second processor is associated to the data requested by the first processor; the method further comprises associating the first processor to the data requested by the first processor in the database; the second interfaces are double-data-rate dynamic random access memory (DDR DRAM) interfaces; and/or the granularity of management of access is by ranges (blocks or pages) of physical memory addresses.

According to another aspect, the invention is embodied as a computer memory control unit. The control unit comprises at least one first interface and second interfaces and is adapted to be connected with a main physical memory via the first interface, and a set of N≥2 non-cooperative processors via the second interfaces. The control unit comprises a logic operatively coupled to the first and second interfaces and configured to perform the above method.

According to another aspect, the invention is embodied as a system comprising the above computer memory control unit connected with a main physical memory via the first interface and with a set of N≥2 non-cooperative processors via the second interfaces.

According to another aspect, the invention is embodied as a computer program comprising instructions for configuring a logic, that is adapted to be operatively coupled to a first interface and second interfaces of a computer memory control unit comprising the logic, the control unit being adapted to be connected with a main physical memory via the first interface and with a set of N≥2 non-cooperative processors via the second interfaces the processors, the instructions being for configuring the logic to perform the above method.

According to another aspect, the invention is embodied as a data storage medium having recorded thereon the above computer program.

The invention claimed is:

1. A method of memory sharing implemented by logic of a computer memory control unit, the control unit comprising at least one first interface and at least two second interfaces and is adapted to be connected with a main physical memory via the first interface, and a set of N≥2 non-cooperative processors via a corresponding one of the at least two second interfaces, the logic operatively coupled to the first and second interfaces, the method comprising:
receiving, via the second interfaces, a request to access data of the main physical memory from a first processor of the set;
evaluating if a second processor has previously accessed the data requested by the first processor; and
deferring the request from the first processor when the evaluation is positive, or, granting the request from the first processor when the evaluation is negative;
wherein at least two of the N≥2 non-cooperative processors are different from one another with respect to a virtual memory interface having different physical page sizes with respect to one another;
and wherein the interfaces comprise both hardware connections and software to interpret control signals.

2. The method of claim 1, further comprising: while deferring the request from the first processor, sending a request to the second processor to write back cache lines, that are related to the data requested by the first processor, to the main physical memory.

3. The method of claim 2, wherein sending the request to the second processor is performed via an interrupt pin of the second processor.

4. The method of claim 3, further comprising: while deferring the request from the first processor, and after sending the request to the second processor, ordering the control unit to transmit the requested cache lines, that are received by the control unit from the second processor, to the main physical memory.

5. The method of claim 4, further comprising: once the second processor has written back all requested cache lines to the main physical memory, granting the request from the first processor.

6. The method of claim 1, wherein the evaluation comprises checking in a database of the control unit if a second processor is associated to the data requested by the first processor.

7. The method of claim 6, wherein the method further comprises associating the first processor to the data requested by the first processor in the database.

8. The method of claim 1, wherein the second interfaces are double-data-rate dynamic random access memory interfaces.

9. The method of claim 1, wherein the granularity of management of access is by ranges of physical memory addresses.

10. A system, comprising:
a computer memory control unit having at least one first interface and at least two second interfaces and is adapted to be connected with a main physical memory via the first interface, and a set of N≥2 non-cooperative processors via a corresponding one of the at least two second interfaces;
logic operatively coupled to the first and second interfaces, the logic configured to:
receive, via the second interfaces, a request to access data of the main physical memory from a first processor of the set;
evaluate if a second processor has previously accessed the data requested by the first processor; and
defer the request from the first processor when the evaluation is positive, or, granting the request from the first processor when the evaluation is negative;
wherein at least two of the N≥2 non-cooperative processors are different from one another with respect to a virtual memory interface having different physical page sizes with respect to one another;
and wherein the interfaces comprise both hardware connections and software to interpret control signals.

11. The system of claim 10, wherein the computer memory control unit is connected with the main physical memory via the first interface and with the set of N≥2 non-cooperative processors via the second interfaces.

12. A non-transitory computer readable storage medium having computer readable instructions stored thereon, that when executed by a computer implement a method of memory sharing implemented by logic of a computer memory control unit, the control unit comprising at least one first interface and at least two second interfaces and is adapted to be connected with a main physical memory via the first interface, and a set of N≥2 non-cooperative processors via a corresponding one of the at least two second interfaces, the logic operatively coupled to the first and second interfaces, the method comprising:

receiving, via the second interfaces, a request to access data of the main physical memory from a first processor of the set;

evaluating if a second processor has previously accessed the data requested by the first processor; and deferring the request from the first processor when the evaluation is positive, or, granting the request from the first processor when the evaluation is negative;

wherein at least two of the N≥2 non-cooperative processors are different from one another with respect to a virtual memory interface having different physical page sizes with respect to one another;

and wherein the interfaces comprise both hardware connections and software to interpret control signals.

13. The computer readable storage medium of claim 12, wherein the method further comprises: while deferring the request from the first processor, sending a request to the second processor to write back cache lines, that are related to the data requested by the first processor, to the main physical memory.

14. The computer readable storage medium of claim 13, wherein sending the request to the second processor is performed via an interrupt pin of the second processor.

15. The computer readable storage medium of claim 14, wherein the method further comprises: while deferring the request from the first processor, and after sending the request to the second processor, ordering the control unit to transmit the requested cache lines, that are received by the control unit from the second processor, to the main physical memory.

16. The computer readable storage medium of claim 15, wherein the method further comprises: once the second processor has written back all requested cache lines to the main physical memory, granting the request from the first processor.

17. The computer readable storage medium of claim 12, wherein the evaluation comprises checking in a database of the control unit if a second processor is associated to the data requested by the first processor.

18. The computer readable storage medium of claim 17, wherein the method further comprises associating the first processor to the data requested by the first processor in the database.

19. The computer readable storage medium of claim 12, wherein the second interfaces are double-data-rate dynamic random access memory interfaces.

20. The computer readable storage medium of claim 12, wherein the granularity of management of access is by ranges of physical memory addresses.

\* \* \* \* \*